United States Patent
Kim et al.

(10) Patent No.: US 10,841,194 B2
(45) Date of Patent: Nov. 17, 2020

(54) METHOD AND APPARATUS FOR ANALYZING TRAFFIC BASED ON FLOW IN CLOUD SYSTEM

(71) Applicant: ELECTRONICS AND TELECOMMUNICATIONS RESEARCH INSTITUTE, Daejeon (KR)

(72) Inventors: Jung Tae Kim, Daejeon (KR); Youngsoo Kim, Daejeon (KR); Jonghyun Kim, Daejeon (KR); Hyun Joo Kim, Daejeon (KR); Jong Geun Park, Daejeon (KR); Sang-Min Lee, Daejeon (KR); Jong-Hoon Lee, Daejeon (KR); Sunoh Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 16/206,662

(22) Filed: Nov. 30, 2018

(65) Prior Publication Data

US 2019/0327164 A1   Oct. 24, 2019

(30) Foreign Application Priority Data

Apr. 18, 2018   (KR) .................. 10-2018-0045289

(51) Int. Cl.
*H04L 12/26*   (2006.01)

(52) U.S. Cl.
CPC ................. *H04L 43/0894* (2013.01)

(58) Field of Classification Search
CPC .............. H04L 43/0894; H04L 41/142; H04L 43/04–045; H04L 43/06–067; H04L 43/08–0894; H04L 43/14; H04L 63/14–1491

See application file for complete search history.

(56) References Cited

U.S. PATENT DOCUMENTS

| | | | |
|---|---|---|---|
| 7,508,768 B2 | 3/2009 | Yoon et al. | |
| 8,898,451 B2 | 11/2014 | Sabo et al. | |
| 9,483,742 B1* | 11/2016 | Ahmed | H04L 63/1441 |
| 9,843,596 B1* | 12/2017 | Averbuch | G06F 21/552 |
| 2011/0149793 A1 | 6/2011 | Kim et al. | |
| 2014/0040514 A1* | 2/2014 | Li | G06F 13/24 |
| | | | 710/48 |

(Continued)

FOREIGN PATENT DOCUMENTS

| | | |
|---|---|---|
| JP | 2013121008 A | 6/2013 |
| KR | 101437008 B1 | 9/2014 |

(Continued)

*Primary Examiner* — Maharishi V Khirodhar
*Assistant Examiner* — Kenneth P Hunt
(74) *Attorney, Agent, or Firm* — Rabin & Berdo, P.C.

(57) ABSTRACT

A method, an apparatus, and a system for analyzing traffic through obtaining flow data of a flow from a switch or a router of a network, calculating an average byte per packet rate (BPR) and a TCP flag ratio (TCPFR) for all flows included in a session including the flow using the flow data, and comparing the average BPR and the TCPFR with an average BPR and a TCPFR of previously-known traffic and determining whether the traffic including the flow is normal traffic or abnormal traffic based on the comparison result are provided.

17 Claims, 6 Drawing Sheets

(56) References Cited

U.S. PATENT DOCUMENTS

| | | | |
|---|---|---|---|
| 2014/0075557 A1 | 3/2014 | Balabine et al. | |
| 2016/0269437 A1 | 9/2016 | McDougal et al. | |
| 2016/0359872 A1* | 12/2016 | Yadav | H04L 63/02 |
| 2018/0124073 A1* | 5/2018 | Scherman | H04L 63/1425 |
| 2018/0337836 A1 | 11/2018 | Balabine et al. | |
| 2019/0327164 A1* | 10/2019 | Kim | H04L 43/0894 |

FOREIGN PATENT DOCUMENTS

| | | |
|---|---|---|
| KR | 20150105436 A | 9/2015 |
| KR | 10-1663401 B1 | 10/2016 |
| KR | 1020170106833 A | 9/2017 |

* cited by examiner

METHOD AND APPARATUS FOR ANALYZING TRAFFIC BASED ON FLOW IN CLOUD SYSTEM

This application claims priority to and the benefit of Korean Patent Application No. 10-2018-0045289 filed in the Korean Intellectual Property Office on Apr. 18, 2018, the entire contents of which are incorporated herein by reference.

BACKGROUND OF THE INVENTION

(a) Field of the Invention

This description relates to a method, an apparatus, and a system for analyzing traffic based on a flow.

(b) Description of the Related Art

Generally, devices for analyzing network traffic analyze headers and payloads of IP (Internet Protocol) packets to determine whether a specific pattern exists or to determine whether the traffic is abnormal based on signatures provided by a third party. In a cloud server environment, since each single server provides an operating system (OS) and various services through various virtual machines (VMs), there are difficulties for a VM which receives and allocates IP traffic to analyze the traffic in a conventional manner. In other words, because the VM performs virtual local area network (VLAN) communication from the perspective of an open virtual switch (OVS) that manages communication of the server, information of the flow and session cannot be easily determined depending the processing overhead. For example, 802.1Q VLAN trunking used in VLAN setting in a virtual switch or the like is a technique using a tagging method, and detects a target host and performs communication with the target host by using 4-byte tag (TPID 16 bits, 2 bits of priority, 1 bit of CFI, and 12 bits of VLAN ID (VID)) added to the Ethernet frame (1518 bytes). Thus, the 802.1Q VLAN trunking does not support IP address-based communication allocated to each VM, therefore, it is not suitable for analyzing the session information. Especially in recent years, as the communication technology based on the encrypted traffic (Secure Sockets Layer (SSL)/Transport Layer Security (TLS)) is actively spread, it is difficult to analyze the payload of the IP packet.

SUMMARY OF THE INVENTION

An exemplary embodiment provides a method for analyzing traffic based on flow data.

Another exemplary embodiment provides an apparatus for analyzing traffic based on flow data.

Yet another exemplary embodiment provides a system for analyzing traffic based on flow data.

According to an exemplary embodiment, a method for analyzing traffic is provided. The method includes: obtaining flow data of a flow from a switch or a router of a network; calculating an average byte per packet rate (BPR) and a TCP flag ratio (TCPFR) for all flows included in a session including the flow using the flow data; and comparing the average BPR and the TCPFR with an average BPR and a TCPFR of previously-known traffic and determining whether the traffic including the flow is normal traffic or abnormal traffic based on the comparison result.

The flow data may include at least one of netflow, sflow, jflow, or cflow.

The calculating may include calculating the average BPR by dividing a size of all packets included in all the flows by a number of all the packets.

The calculating may include calculating a ratio of a number of TCP flags of all the flows to a number of all the flows as the TCPFR.

The determining may include: calculating a similarity between a first vector corresponding to the average BPR and the TCPFR of the traffic and n second vectors corresponding to the average BPR and the TCPFR of the previously-known traffic; and determining whether the traffic is the normal traffic or the abnormal traffic based on the calculated similarity.

The first vector and the n second vectors may have k+1 dimension when a number of TCP flags is k.

The calculating the similarity may include: calculating a vector similarity between the first vector and the n second vectors; and determining a traffic type corresponding to a second vector having a highest vector similarity with the first vector among the n second vectors as a type of the traffic.

The switch or the router may be an Open Virtual Switch (OVS) of a cloud system.

The using the flow data may include obtaining a flag of the flow, a number of packets included in the flow, and a size of the packet by parsing the flow data.

According to another exemplary embodiment, an apparatus for analyzing traffic is provided. The apparatus includes a processor, a memory, and a network interface, wherein the processor executes a program stored in the memory to perform: obtaining flow data of a flow from a switch or a router of a network through the network interface, calculating an average byte per packet rate (BPR) and a TCP flag ratio (TCPFR) for all flows included in a session including the flow using the flow data; and comparing the average BPR and the TCPFR with an average BPR and a TCPFR of previously-known traffic and determining whether the traffic including the flow is normal traffic or abnormal traffic based on the comparison result.

The flow data may include at least one of netflow, sflow, jflow, or cflow.

When performing the calculating, the processor may execute the program to perform calculating the average BPR by dividing a size of all packets included in all the flows by a number of all the packets.

When performing the calculating, the processor may execute the program to perform calculating a ratio of a number of TCP flags of all the flows to a number of all the flows as the TCPFR.

When performing the determining, the processor may executes the program to perform: calculating a similarity between a first vector corresponding to the average BPR and the TCPFR of the traffic and n second vectors corresponding to the average BPR and the TCPFR of the previously-known traffic; and determining whether the traffic is the normal traffic or the abnormal traffic based on the calculated similarity.

The first vector and the n second vectors may have k+1 dimension when a number of TCP flag is k.

When performing the calculating the similarity, the processor may execute the program to perform: calculating a vector similarity between the first vector and the n second vectors; and determining a traffic type corresponding to a second vector having a highest vector similarity with the first vector among the n second vectors as a type of the traffic.

The switch or the router may be an Open Virtual Switch (OVS) of a cloud system.

The using of the flow data may include obtaining a flag of the flow, a number of packets included in the flow, and a size of the packet by parsing the flow data.

According to yet another exemplary embodiment, a cloud-based traffic analysis system is provided. The system includes an Open Virtual Switch (OVS) configured to provide flow data of a flow; and a traffic analyzer configured to calculate an average byte per packet ratio (BPR) and a TCP flag ratio (TCPFR) for all flows included in a session including the flow by using the flow data, compare the average BPR and the TCPFR with an average BPR and a TCPFR of previously-known traffic, and determine whether traffic including the flow is normal traffic or abnormal traffic based on the comparison result.

DETAILED DESCRIPTION OF THE EMBODIMENTS

Hereinafter, exemplary embodiments of the present disclosure will be described in detail with reference to the accompanying drawings so that those skilled in the art may easily practice the present disclosure. However, the present disclosure may be modified in various different ways and is not limited to embodiments described herein. In the accompanying drawings, portions unrelated to the description will be omitted in order to obviously describe the present disclosure, and similar reference numerals will be used to describe similar portions throughout the present specification.

Figure 1:
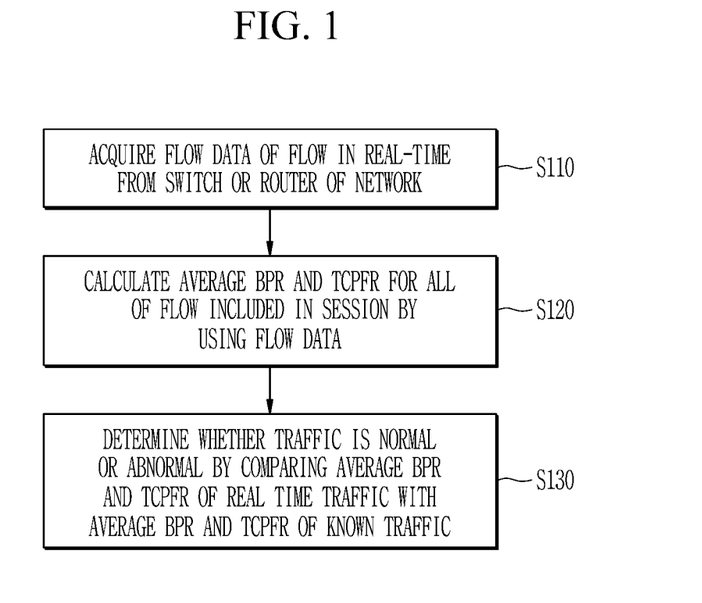
FIG. 1 is a flowchart illustrating a traffic analysis method according to an exemplary embodiment.
Figure 2:
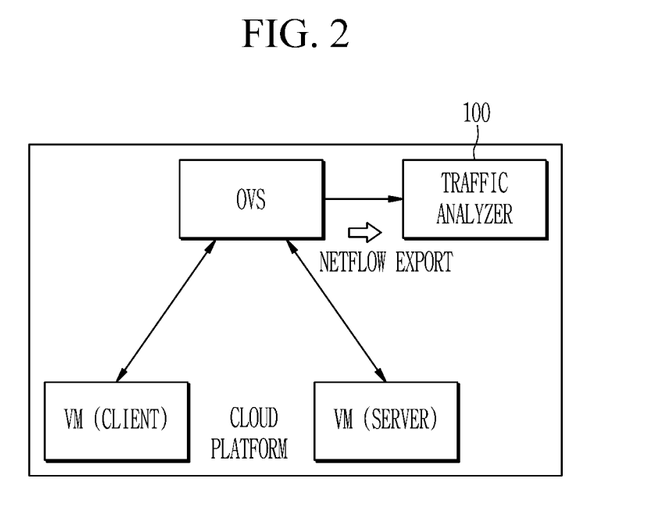
FIG. 2 is a schematic diagram illustrating a cloud-based traffic analysis system according to an exemplary embodiment.

FIG. 1 is a flowchart illustrating a traffic analysis method according to an exemplary embodiment, and FIG. 2 is a schematic diagram illustrating a cloud-based traffic analysis system according to an exemplary embodiment.

Referring to FIG. 1, the traffic analyzer 100 according to an exemplary embodiment obtains flow data of traffic from a switch (for example, OVS in a cloud environment) or a router in real time (S110). A flow is a set of IP packets with common properties that pass through the point of view included in the network for specific time duration. The flow data may include at least one of netflow, sflow, jflow, and cflow. In the following, the traffic analyzer 100 may analyze the traffic using NetFlow among the flow data, which is merely an exemplary embodiment in which the traffic analyzer 100 analyzes traffic based on flow data. This specification is not limited thereto.

The traffic analyzer 100 according to the exemplary embodiment may receive a netflow by setting a Netflow Export in the OVS connected to a client-side VM and a server-side VM, respectively. The traffic analyzer 100 may parse the netflow to obtain a flow record. Table 1 below is an example of a flow record (flow index=1) obtained from the netflow.

TABLE 1

| INDEX | 1 |
| --- | --- |
| PROTOCOL | TCP |
| SOURCE | 192.168.120.21 |
| DESTINATION | 10.11.10.11: 443 |
| BEGIN TIME | 2017 Feb. 1 11:20:49.771 |
| END TIME | 2017 Feb. 1 11:20:50.000 |
| TCP FLAG | SYN/FIN/RST |
| PACKETS/ OCTETS | 4/205, 5/245, 6/285, 7/333 |

Referring to Table 1, the protocol of the flow is Transmission Control Protocol (TCP). The source IP address (srcaddr/port) is 192.168.120.21, and the destination IP address (dstaddr/port) is 10.11.10.11: 443. TCP FLAG (tcp_flags) of the flow of Table 1 is SYN/FIN/RST in URG/ACK/PSH/RST/SYN/FIN and the number of packets (dPkts) included in the flow and a byte size of the packets (dOctets) of the flow 4/205, 5/245, 6/285, 7/333. The flow history of Table 1 is obtained from 11:20:49.771 on Feb. 1, 2017 (the start packet of the flow) until 11:20:50 on the same day (the last packet of the flow).

Figure 3:
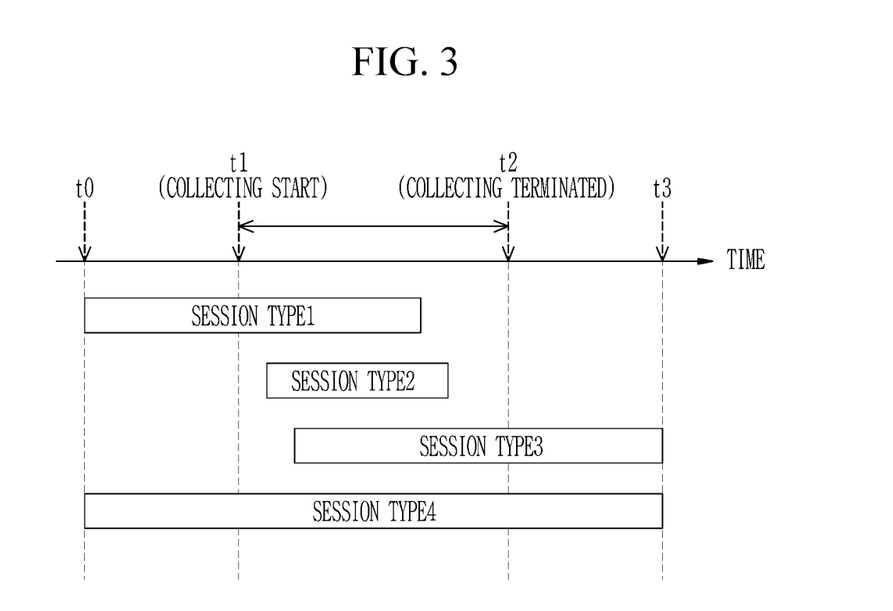
FIG. 3 is a schematic diagram illustrating a time interval during which the flow data is collected according to an exemplary embodiment.
Figure 4:
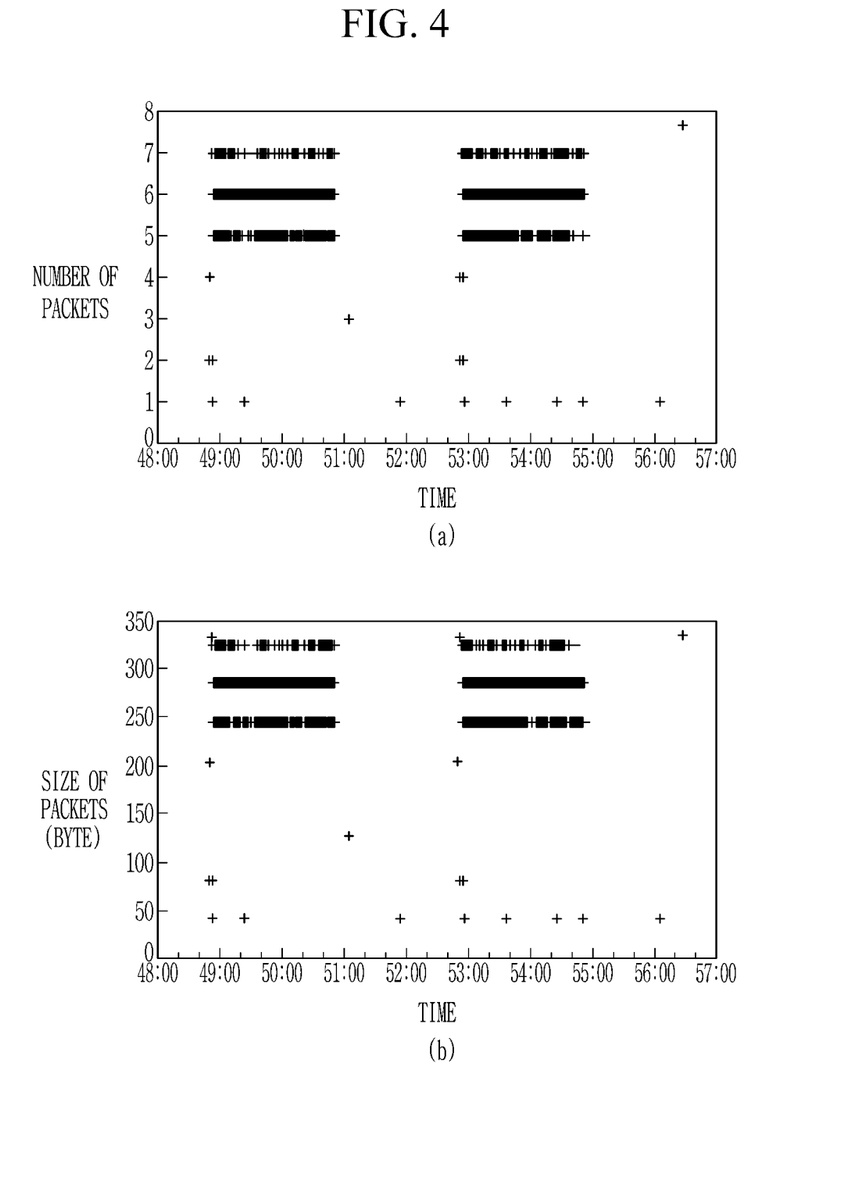
FIG. 4 is a graph illustrating the number of packets included in a flow and the byte size of the packet of the flow according to an exemplary embodiment.
Figure 5:
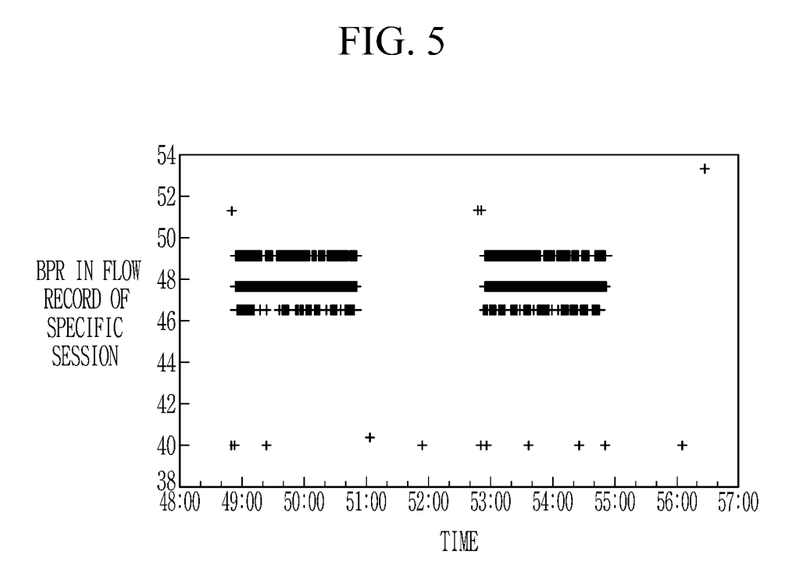
FIG. 5 is a graph illustrating a BPR of a packet included in the flow according to an exemplary embodiment.

FIG. 3 is a schematic diagram illustrating a time interval during which the flow data is collected according to an exemplary embodiment, FIG. 4 is a graph illustrating the number of packets included in a flow and the byte size of the packet of the flow according to an exemplary embodiment, and FIG. 5 is a graph illustrating a BPR of a packet included in the flow according to an exemplary embodiment.

The traffic analyzer 100 may collect flow data for all sessions in progress during the acquisition time (time interval between t1 and t2). Referring to FIG. 3, the session type 1 starts before the collection start time t1 of the flow data and ends before the collection end time t2 of the flow data, the session type 2 starts and ends between t1 and t2, the session type 3 starts after t1 and ends after t2, and the session type 4 starts before t1 and ends after t2. That is, the traffic analyzer 100 may collect flow data of all the flows or some flows (sampled flows) included in all the sessions that are in progress between the collection start time and the collection end time of the flow data. The flow data of Table 1 is obtained from the traffic included in a specific one session.

Referring to FIG. 4, the byte size of the packet and the number of packets included in the flow of two communication sessions (49 to 51 minutes and 53 to 55 minutes) lasting two minutes may be known. Referring to FIG. 4, the number of the packets of the flows included in two communication sessions are mainly 5, 6, and 7, and the byte size of each packet is 245, 285, and 333 bytes. That is the byte size has constant values.

Referring again to FIG. 1, the traffic analyzer 100 calculates an average byte per packet ratio (BPR) and a TCP flag ratio (TCPFR) for all flows included in the session by using the flow data (S120). The traffic analyzer 100 may calculate the BPR of the packet included in each flow. Referring to FIG. 5, since the size of the packet is 245 bytes and the number of the packets is 5, the BPR is 49 (245/5). Since the size of the packet is 285 bytes and the number of the packets is 6, the BPR is 47.5 (285/6). Since the size of the packet is 333 bytes and the number of packets is 7, the BPR is 47.5714 (333/7). Therefore, when the packets in the flow are bundled in a specific number and the size of each packet is constant, the BPR calculated for the specific flow converges to certain numbers, and based on this, it can be estimated that the traffic including the specific flow is abnormal.

The traffic analyzer 100 according to the exemplary embodiment may estimate the type of traffic based on the average BPR and the TCPFR for all the flows collected during the acquisition time. The average BPR may be calculated by dividing the size of all packets included in all the flows by the number of all the packets. All the packets are included in all the flows collected during acquisition time. Referring to Table 2 below, there are 66 flows corresponding to all the flow data collected during the acquisition time, the total number of packets included in the flow is 396, and the total size of all packets is 18,810 bytes. The average number of packets per flow is 6, and the average size of the packets is 285 bytes. The average total byte per total packet ratio (BPR) is 47.5.

TABLE 2

| | |
|---|---|
| Total Packet/Total OCTETS | 396/18,810 |
| Total Flows | 66 |
| AV Packet/Byte | 6/285 |
| BPR | [51.25, 49 . . . 47.5, 47.5714] |
| TCPFR | [URG: 0, ACK: 0, PSH: 0, RST: 66, SYN: 66, FIN: 66] = [0, 0, 0, 1, 1, 1] |
| Threshold | AV BPR (47.5)/EndTime − BeginTime (1 min) = 47.5 |

The TCPFR in Table 2 indicates the ratio of the TCP flags (number of flags/total number of flows) of each flow. Since the RST flag is 66, the SYN flag is 66, and the FIN flag is 66, TCPFR is [0,0,0,1,1,1]. In Table 2, thresholds may be used to identify the type of encrypted traffic.

Next, the traffic analyzer 100 compares the average BPR and the TCPFR of the flow data collected in real time with an average BPR and TCPFR of a previously-known traffic type to determine whether the traffic is normal or abnormal (S130). Alternatively, the traffic analyzer 100 may compare the threshold and the TCPFR of the flow data collected in real time with the threshold and the TCPFR of the known traffic type to determine whether the traffic is normal or abnormal. Tables 3 to 12 below show flow record and BPR, TCPFR of known traffic types. Tables 1 and 2 above show flow record when the flow type is DDOS-HTTPs Get Flooding.

Table 3 represents flow record of DDOS-TCP flood (abnormal traffic) (index=2), and Table 4 represents the BPR and the TCPFR of the DDOS-TCP flood.

TABLE 3

| | |
|---|---|
| INDEX | 2 |
| PROTOCOL | TCP |
| SOURCE | 192.168.120.20 |
| DESTINATION | 10.11.10.11: 443 |
| BEGIN TIME | 2017 Feb. 17 15:44:05.420 |
| END TIME | 2017 Feb. 17 15:48:35.745 |
| TCP FLAG | SYN |
| PACKETS/OCTETS | 1931/2052544, 1932/2053608, 1933/2053648, 1934/2054712, 1936/2056840, 1940/2053648 |

TABLE 4

| | |
|---|---|
| Total Packet/Total OCTETS | 58,020/61,641,360 |
| Total Flows | 30 |

TABLE 4-continued

| | |
|---|---|
| AV Packet/Byte | 1934/2054712 |
| BPR | [1062.943 . . . 1062.414 . . . 1058.581] |
| TCPFR | [URG: 0, ACK: 0, PSH: 0, RST: 0, SYN: 30, FIN: 0] = [0, 0, 0, 0, 1, 0] |
| Threshold | AV BPR (1062)/EndTime − BeginTime (1 min) = 1062 |

Referring to Table 3 and Table 4, the average BPR of the DDOS-TCP Flood is 1062 and the TCPFR is [0,0,0,0,1,0].

Table 5 below represents the flow record of DDOS-TCP Multi-Connect (abnormal traffic) (index=3), and Table 6 represents the BPR and the TCPFR of the DDOS-TCP Multi-Connect.

TABLE 5

| | |
|---|---|
| INDEX | 3 |
| PROTOCOL | TCP |
| SOURCE | 192.168.120.21 |
| DESTINATION | 10.11.10.11: 443 |
| BEGIN TIME | 2017 Feb. 17 16:58:05.210, |
| END TIME | 2017 Feb. 17 16:58:05.330 |
| TCP FLAG | SYN/FIN |
| PACKETS/OCTETS | 1/48, 2/88, 4/168 |

TABLE 6

| | |
|---|---|
| Total Packet/Total OCTETS | 120/5,040 |
| Total Packet/Total OCTETS | |
| Total Flows | 30 |
| AV Packet/Byte | 4/168 |
| BPR | [42 . . . 44 . . . 48] |
| TCPFR | [URG: 0, ACK: 0, PSH: 0, RST: 0, SYN: 16, FIN: 16] = [0, 0, 0, 0, 1, 1] |
| Threshold | AV BPR (44)/EndTime − BeginTime (1 min) = 44 |

Referring to Table 5 and Table 6, the average BPR of the DDOS-TCP Multi-Connect is 44 and the TCPFR is [0,0,0,0,1,1].

Table 7 below represents the flow record of DDOS-TCP termination wait (FIN WAIT) (abnormal traffic) (index=4), and Table 8 represents the BPR and the TCPFR of the DDOS-TCP termination wait.

TABLE 7

| | |
|---|---|
| INDEX | 4 |
| PROTOCOL | TCP |
| SOURCE | 192.168.120.21 |
| DESTINATION | 10.11.10.11: 443 |
| BEGIN TIME | 2017 Mar. 20 11:33:49.774 |
| END TIME | 2017 Mar. 20 11:33:58.178 |
| TCP FLAG | SYN |
| PACKETS/OCTETS | 3/144 |

TABLE 8

| | |
|---|---|
| Total Packet/Total OCTETS | 45/3,600 |
| Total Packet/Total OCTETS | |
| AV Packet/Byte | 3/144 |
| Total Flows | 15 |
| BPR | [48] |

TABLE 8-continued

| TCPFR | [URG: 0, ACK: 0, PSH: 0, RST: 0, SYN: 15, FIN: 0] = [0, 0, 0, 0, 1, 0] |
|---|---|
| Threshold | AV BPR (48)/EndTime − BeginTime (1 min) = 48 |

Referring to Tables 7 and 8, the average BPR of the DDOS-TCP FIN WAIT is 48 and the TCPFR is [0,0,0,0,1,0].

Table 9 below represents the flow record of normal Google Web Access (normal traffic) (index=5), and Table 10 represents the BPR and the TCPFR of the normal Google Web connection.

TABLE 9

| INDEX | 5 |
|---|---|
| PROTOCOL | TCP/UDP |
| SOURCE | 10.10.100.102 |
| DESTINATION | 172.217.26.42: 443 |
| BEGIN TIME | 2018 Jan. 26 14:59:22.546, |
| END TIME | 2018 Jan. 26 15:00:28.511 |
| TCP FLAG | SYN, RST/FIN, NOP, SYN/RST/FIN |
| PACKETS/ OCTETS | 6/725, 2/80, 12/3795, 10/3637, 2/771, 1/41, 5/464 |

TABLE 10

| Total Packet/ Total OCTETS | 38/9,513 |
|---|---|
| Total Packet/ Total OCTETS | |
| Total Flows | 7 |
| AV Packet/Byte | 5.42/1,359 |
| BPR | [120, 40, 316, 363.7, 385, 41, 92.8] |
| TCPFR | [URG: 0, ACK: 2, PSH: 2, RST: 2, SYN: 2, FIN: 2] = [0, 1, 1, 1, 1, 1] |
| Threshold | AV BPR (194)/EndTime − BeginTime (1 min) = 194 |

Referring to Tables 9 and 10, the average BPR of the Google Web Access is 194 and the TCPFR is [0,1,1,1,1,1].

Table 11 below represents a flow record of NORMAL-Email Access (normal traffic) (index=6), and Table 12 represents the BPR and the TCPFR of the NORMAL-Email Access.

TABLE 11

| INDEX | 6 |
|---|---|
| PROTOCOL | TCP |
| SOURCE | 10.10.100.102 |
| DESTINATION | 113.29.186.61 995 (POP SSL) |
| BEGIN TIME | 2018 Jan. 26 14:58:35.794, |
| END TIME | 2018 Jan. 26 15:56:16.837 |
| TCP FLAG | SYN/FIN, SIN/RST/FIN |
| PACKETS/ OCTETS | 70/3467, 39/2167, 38/2107, 60/3066, 45/2484, 44/2367, 44/2415, 40/2132, 36/2047, 37/2087, 150/6693 |

TABLE 12

| Total Packet/ Total OCTETS | 603/31,032 |
|---|---|
| Total Packet/ Total OCTETS | |
| Total Flows | 11 |
| AV Packet/Byte | 54.81/2,821.09 |
| BPR | [49.52, 55.56, 55.44, 51.1, 55.2, 53.79, 54.88, 53.3, 56.86, 56.40, 44.62] |

TABLE 12-continued

| TCPFR | [URG: 0, ACK: 0, PSH: 0, RST: 2, SYN: 11, FIN: 11] = [0, 0, 0, 1, 5, 5] |
|---|---|
| Threshold | AV BPR (53.33)/Connection = 53.33 |

Referring to Tables 11 and 12, the average BPR of the e-mail connection is 53.33 and the TCPFR is [0,0,0,1,5,5]. That is, as can be seen from the above table, each traffic type has a characteristic average BPR and TCPFR, so the average BPR and the TCPFR may be representative indicators for each traffic type.

When the traffic analyzer 100 compares the average BPR and the TCPFR of the flow data (or real-time traffic) collected in real-time with the average BPR and the TCPFR of a known traffic type to determine whether the traffic is normal or abnormal, the similarity between vectors including the average BPR and the TCPFR may be used. For example, in Table 1 to Table 12, since the average BPR is a one-dimensional vector and the TCPFR is a six-dimensional vector, the traffic analyzer 100 may calculate the similarity between vectors using a seven-dimensional vector. Table 13 below represents the average BPR and the TCPFR of the known traffic types of Tables 1 to 12.

TABLE 13

| index | average BPR | TCPFR |
|---|---|---|
| 1 | 47.5 | [0, 0, 0, 1, 1, 1] |
| 2 | 1062 | [0, 0, 0, 0, 1, 0] |
| 3 | 44 | [0, 0, 0, 0, 1, 1] |
| 4 | 48 | [0, 0, 0, 0, 1, 0] |
| 5 | 194 | [0, 1, 1, 1, 1, 1] |
| 6 | 53.33 | [0, 0, 0, 1, 5, 5] |

The traffic analyzer 100 according to an exemplary embodiment stores the BPR and the TCPFR of various types of traffic in a database, and may match the BPR and the TCPFR of real-time traffic with the BPR and TCPFR of known traffic stored in a database. For example, if there are n known traffic types stored in the database, the similarity calculation may be performed n times.

Since various encrypted sessions such as Web communication HTTPS 443, e-mail IMAP 993, POP 995, SMTP 465, SSH/SecureFTP 22, etc. may be distinguished through the destination port number (TCP/UDP destination port number, dstport) in the flow record, it can be compared with a previously known encrypted traffic type when determining whether the session is normal or abnormal. For example, when the number of types of encrypted traffic stored in the database is m (n≥m), the similarity calculation is performed m times because the real-time traffic is determined to be encrypted through the destination port number.

Meanwhile, the traffic analyzer 100 may determine whether the real-time traffic is normal or abnormal by calculating the similarity between the BPR and the TCPRF of the real-time traffic and the BPR and the TCPFR of the known traffic stored in the database according to the Equation 1 below.

$$a \cdot b = \|a\|\|b\|\cos\theta bb = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{[Equation 1]}$$

Equation 1 shows a method of calculating the cosine similarity among the methods of calculating the vector similarity between two vectors. The present description is not limited thereto. In Equation 1, a vector a represents the average BPR and the TCPFR of the real-time traffic, and a vector b is a vector representing the average BPR and the TCPFR of the previously-known traffic. For example, the vector a is represented by the Equation 2.

$$a=[x,y,y,y,y,y,y] \quad \text{[Equation 2]}$$

In Equation 2, the element x of the vector a represents the average BPR and the remaining elements [y,y,y,y,y,y] represent the TCPFR. The traffic analyzer 100 according to the exemplary embodiment may determine whether the real-time traffic is the normal traffic or the abnormal traffic or whether the session including the real-time traffic is the normal session or the abnormal session through the similarity calculation between n vectors corresponding to the TCPFR and the average BPR of the real-time traffic and the TCPFR and the average BPR of the previously-known traffic. In the cosine similarity according to Equation 1, the similarity between vectors may be determined according to whether the cosine similarity (0 to 1) is close to 1 or not. For example, when the cosine similarity is close to 1 (i.e., result value≈1), it can be determined that the similarity between the two vectors is high. When the cosine similarity is close to 0, it may be determined that the similarity between both vectors is low. High similarity between both vectors means that the real-time traffic corresponds to a specific traffic type. For example, when the similarity between the vector [x,y,y,y,y,y,y] and a vector [44,0,0,0,0,1,1] is close to 1, the session including the real-time traffic is a session of a DDOS-TCP Multi-Connect attack corresponding to the vector [44,0,0,0,0,1,1]. That is, a traffic type corresponding to a vector of which the cosine similarity calculated for the vector of the real-time traffic is close to 1 may be determined as the type of the real-time traffic.

As described above, by using the newly defined BPR and TCPFR in this specification, it is possible to quickly and accurately determine whether the traffic is normal or abnormal. Further, since the BPR and the TCPFR can be quickly computed using less computational resources, the performance of computation devices providing security services over the cloud network can be improved and maintenance costs can be saved.

Figure 6:
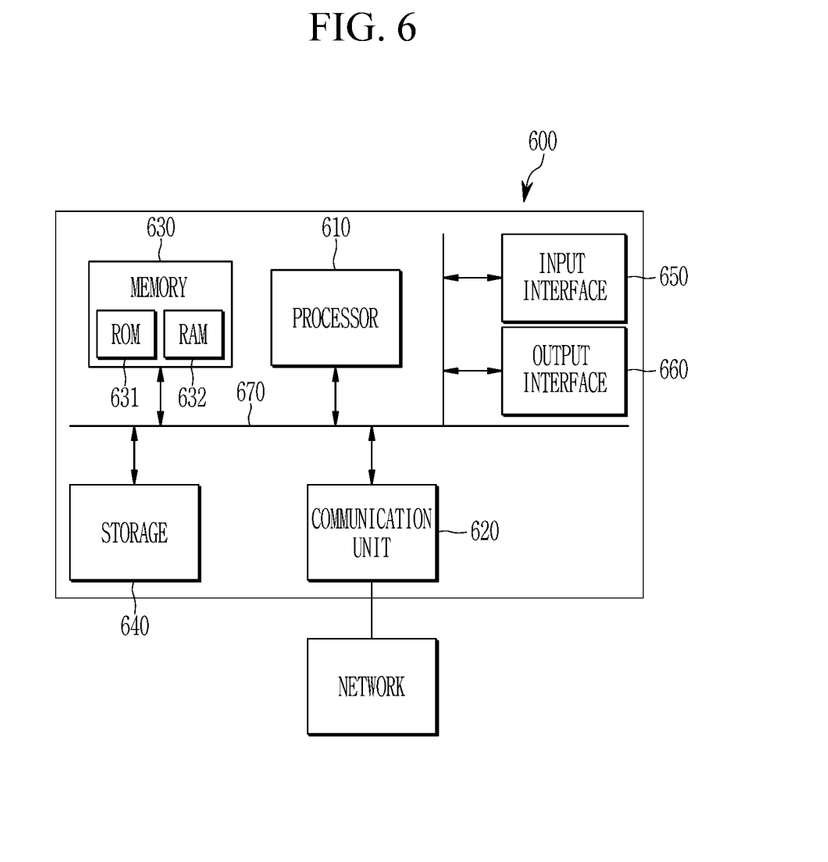
FIG. 6 is a block diagram illustrating a traffic analyzer according to an exemplary embodiment.

FIG. 6 is a block diagram illustrating a traffic analyzer according to an exemplary embodiment.

The traffic analyzer according to an exemplary embodiment may be implemented as a computer system, for example a computer readable medium. Referring to FIG. 6, a computer system 600 may include at least one of processor 610, a memory 630, an input interface 650, an output interface 660, and storage 640. The computer system 600 may also include a communication device 620 coupled to a network. The processor 610 may be a central processing unit (CPU) or a semiconductor device that executes instructions stored in the memory 630 or storage 640. The memory 630 and the storage 640 may include various forms of volatile or non-volatile storage media. For example, the memory may include read only memory (ROM) or random access memory (RAM). In the exemplary embodiment of the present disclosure, the memory may be located inside or outside the processor, and the memory may be coupled to the processor through various means already known.

Thus, embodiments of the present invention may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The communication device 620 may transmit or receive a wired signal or a wireless signal.

On the contrary, the embodiments of the present invention are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for analyzing traffic, comprising:
obtaining flow data of a flow from a switch or a router of a network;
calculating an average byte per packet rate (BPR) and a Transmission Control Protocol flag ratio (TCPFR) for all flows included in a session including the flow using the flow data; and
comparing the average BPR and the TCPFR with an average BPR and a TCPFR of previously-known traffic and determining whether the traffic including the flow is normal traffic or abnormal traffic based on the comparison result,
wherein the determining comprises:
calculating a similarity between a first vector corresponding to the average BPR and the TCPFR of the traffic and n second vectors corresponding to the average BPR and the TCPFR of the previously-known traffic; and
determining whether the traffic is the normal traffic or the abnormal traffic based on the calculated similarity.

2. The method of claim 1, wherein the flow data includes at least one of netflow, sflow, jflow, or cflow.

3. The method of claim 1, wherein the calculating comprises
calculating the average BPR by dividing a size of all packets included in all the flows by a number of all the packets.

4. The method of claim 1, wherein the calculating comprises
calculating a ratio of a number of TCP flags of all the flows to a number of all the flows as the TCPFR.

5. The method of claim 1, wherein the first vector and the n second vectors have a k+1 dimension when a number of TCP flags is k.

6. The method of claim 1, wherein the calculating the similarity comprises:
calculating a vector similarity between the first vector and the n second vectors; and
determining a traffic type corresponding to a second vector having a highest vector similarity with the first vector among the n second vectors as a type of the traffic.

7. The method of claim 1, wherein the switch or the router is an Open Virtual Switch (OVS) of a cloud system.

8. The method of claim 1, wherein the using the flow data includes obtaining a flag of the flow, a number of packets included in the flow, and a size of the packet by parsing the flow data.

9. An apparatus for analyzing traffic, comprising:
a processor, a memory, and a network interface,
wherein the processor executes a program stored in the memory to perform:
obtaining flow data of a flow from a switch or a router of a network through the network interface,
calculating an average byte per packet rate (BPR) and a Transmission Control Protocol flag ratio (TCPFR) for all flows included in a session including the flow using the flow data; and
comparing the average BPR and the TCPFR with an average BPR and a TCPFR of previously-known traffic and determining whether the traffic including the flow is normal traffic or abnormal traffic based on the comparison result,
wherein when performing the determining, the processor executes the program to perform:
calculating a similarity between a first vector corresponding to the average BPR and the TCPFR of the traffic and n second vectors corresponding to the average BPR and the TCPFR of the previously-known traffic; and
determining whether the traffic is the normal traffic or the abnormal traffic based on the calculated similarity.

10. The apparatus of claim 9, wherein the flow data includes at least one of netflow, sflow, jflow, or cflow.

11. The apparatus of claim 9, wherein when performing the calculating, the processor executes the program to perform
calculating the average BPR by dividing a size of all packets included in all the flows by a number of all the packets.

12. The apparatus of claim 9, wherein when performing the calculating, the processor executes the program to perform
calculating a ratio of a number of TCP flags of all the flows to a number of all the flows as the TCPFR.

13. The apparatus of claim 9, wherein the first vector and the n second vectors have a k+1 dimension when a number of TCP flags is k.

14. The apparatus of claim 9, wherein when performing the calculating the similarity, the processor executes the program to perform:
calculating a vector similarity between the first vector and the n second vectors; and
determining a traffic type corresponding to a second vector having a highest vector similarity with the first vector among the n second vectors as a type of the traffic.

15. The apparatus of claim 9, wherein the switch or the router is an Open Virtual Switch (OVS) of a cloud system.

16. The apparatus of claim 9, wherein the using of the flow data includes obtaining a flag of the flow, a number of packets included in the flow, and a size of the packet by parsing the flow data.

17. A cloud-based traffic analysis system, comprising:
an Open Virtual Switch (OVS) configured to provide flow data of a flow; and
a traffic analyzer configured to
calculate an average byte per packet ratio (BPR) and a Transmission Control Protocol flag ratio (TCPFR) for all flows included in a session including the flow by using the flow data;
calculate a similarity between a first vector corresponding to the average BPR and the TCPFR of the traffic and n second vectors corresponding to the average BPR and the TCPFR of previously-known traffic; and
determine whether the traffic is normal traffic or abnormal traffic based on the calculated similarity.

* * * * *